(12) United States Patent
Kishi et al.

(10) Patent No.: US 11,843,335 B2
(45) Date of Patent: Dec. 12, 2023

(54) MOTOR ADJUSTMENT METHOD

(71) Applicant: Nidec Corporation, Kyoto (JP)

(72) Inventors: Sakuya Kishi, Kyoto (JP); Koichi Takae, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 0 days.

(21) Appl. No.: 17/880,844

(22) Filed: Aug. 4, 2022

(65) Prior Publication Data

US 2023/0067993 A1 Mar. 2, 2023

(30) Foreign Application Priority Data

Aug. 25, 2021 (JP) ................. 2021-137583

(51) Int. Cl.
| | | |
|---|---|---|
| G05B 5/00 | (2006.01) | |
| H02P 23/14 | (2006.01) | |
| H02P 23/20 | (2016.01) | |
| H02P 27/08 | (2006.01) | |

(52) U.S. Cl.
CPC .............. *H02P 23/14* (2013.01); *H02P 23/20* (2016.02); *H02P 27/08* (2013.01)

(58) Field of Classification Search
CPC .......... H02P 23/14; H02P 23/20; H02P 27/08; H02P 21/18; H02P 2203/03
See application file for complete search history.

(56) References Cited

U.S. PATENT DOCUMENTS

2010/0264862 A1 10/2010 Kitagawa
2017/0272010 A1 9/2017 Fu et al.
2019/0260304 A1 8/2019 Ogawa et al.
2020/0052618 A1 2/2020 Sato
2020/0317257 A1 10/2020 Ootake et al.
2021/0067081 A1 3/2021 Nakazima et al.

FOREIGN PATENT DOCUMENTS

| CN | 115833683 A | * | 3/2023 |
|---|---|---|---|
| JP | 09-047066 A | | 2/1997 |
| JP | 2004-032848 A | | 1/2004 |
| JP | 2005-110363 A | | 4/2005 |
| JP | 6669589 B2 | | 3/2020 |

OTHER PUBLICATIONS

Official Communication issued in corresponding European Patent Application No. 22191892.3, dated Jan. 9, 2023.
Kuruppu et al., "Post Production PMSM Position Sensor Offset Error Quantification via Voltage Estimation", IEEE Energy Conversion Congress and Exposition (ECCE), Oct. 11, 2020, pp. 3355-3361.

* cited by examiner

*Primary Examiner* — Karen Masih
(74) *Attorney, Agent, or Firm* — KEATING & BENNETT

(57) ABSTRACT

A motor adjustment method adjusts a motor driven by a controller. The motor adjustment method includes acquiring forward rotation information indicating a change in a value of a current flowing through a driver at the time of a rotor rotating in a forward direction when a Hall sensor setting position is changed, acquiring reverse rotation information indicating a change in a value of a current flowing through the driver at the time of the rotor rotating in a reverse direction when the Hall sensor setting position is changed, and determining a Hall sensor adjustment position on the basis of the forward rotation information and the reverse rotation information. The Hall sensor adjustment position indicates a position obtained by adding a correction amount to the Hall sensor setting position.

5 Claims, 10 Drawing Sheets

MOTOR ADJUSTMENT METHOD

CROSS-REFERENCE TO RELATED APPLICATIONS

The present application claims priority under 35 U.S.C. § 119 to Japanese Patent Application No. 2021-137583, filed on Aug. 25, 2021, the entire contents of which are hereby incorporated herein by reference.

FIELD OF THE INVENTION

The present disclosure relates to a motor adjustment method.

BACKGROUND

A conventional brushless motor control device includes an inverter circuit, a rotor magnetic pole detection unit, a rotor position estimation unit, a current detection unit, and an electrical angle correction unit. The inverter circuit rotates the motor in a forward direction. The electrical angle correction unit determines an electrical angle offset on the basis of the variation of a power supply current value, and corrects an estimated rotor position signal by adding the electrical angle offset to the electrical angle indicated by the estimated rotor position signal.

However, the conventional brushless motor control device may not be able to calculate the electrical angle offset with high accuracy. As a result, the motor cannot be adjusted with high accuracy.

SUMMARY

According to an example embodiment of the present disclosure, a motor adjustment method adjusts a motor driven by a controller. The motor includes a stator that includes windings of a plurality of phases, a rotor that is rotatable with respect to the stator, and a Hall sensor that is spaced from the rotor to detect a magnetic pole of the rotor. The controller includes a driver to apply a drive voltage to the windings of the plurality of phases, a rotational speed calculator to calculate a rotational speed of the rotor based on a change in a magnetic pole detected by the Hall sensor, and an energization controller to control an energization timing for each of the windings of the plurality of phases on a basis of the rotational speed and a Hall sensor setting position. The motor adjustment method includes acquiring forward rotation information indicating a change in a value of a current flowing through the driver at a time of the rotor rotating in a forward direction when the Hall sensor setting position is changed, acquiring reverse rotation information indicating a change in a value of a current flowing through the driver at a time of the rotor rotating in a reverse direction when the Hall sensor setting position is changed, and determining a Hall sensor adjustment position on a basis of the forward rotation information and the reverse rotation information. The Hall sensor adjustment position indicates a position obtained by adding a correction amount to the Hall sensor setting position.

The above and other elements, features, steps, characteristics and advantages of the present disclosure will become more apparent from the following detailed description of the example embodiments with reference to the attached drawings.

DETAILED DESCRIPTION

Figure 1:
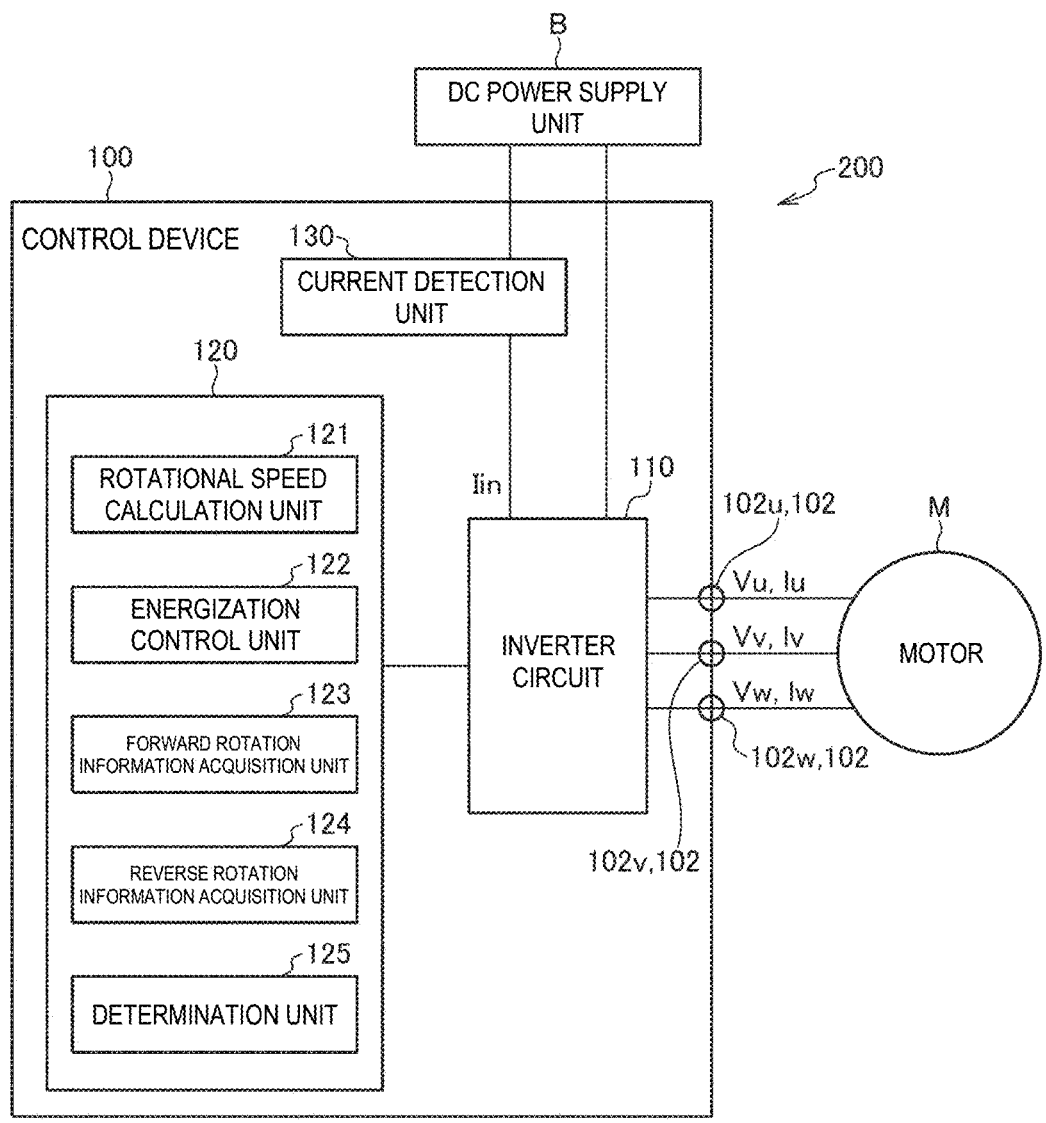
FIG. 1 is a block diagram of a controller according to a first example embodiment of the present disclosure.

Hereinafter, example embodiments of the present disclosure will be described with reference to the drawings. In the drawings, the same or corresponding portions are denoted by the same reference signs and description thereof will not be repeated.

With reference to FIG. 1, an adjustment system 200 according to an example embodiment of the present disclosure will be described. FIG. 1 is a block diagram of the adjustment system 200 according to the present example embodiment of the present disclosure.

As illustrated in FIG. 1, the adjustment system 200 includes a controller 100 and a DC power supply unit B. A motor M is connected to the controller 100. For example, the motor M before shipment is connected to the controller 100. The motor M is, for example, a brushless DC motor. The motor M has a U phase, a V phase, and a W phase. The motor M is driven by the controller 100.

The DC power supply unit B applies a voltage. For example, the DC power supply unit B applies a voltage of a predetermined value. The predetermined value is determined by a user, for example.

The controller 100 adjusts the motor M. Specifically, the controller 100 adjusts the driving of the motor M. More specifically, the controller 100 adjusts a Hall sensor setting position to be described later. The controller 100 includes an inverter circuit 110, a controller 120, and a current detector 130. The inverter circuit 110 is an example of a "driver".

The current detector 130 detects a current Iin flowing through the inverter circuit 110. The current detector 130 outputs the detection result to the controller 120. As a result, the controller 120 can accurately acquire the current Iin flowing through the inverter circuit 110.

The controller 100 outputs three-phase AC power. The controller 100 includes three output terminals 102. The three output terminals 102 include an output terminal 102u, an output terminal 102v, and an output terminal 102w. The three output terminals 102 output a three-phase output voltage's and a three-phase output current to the motor M. Specifically, an output terminal 102u outputs a U-phase output voltage Vu and a U-phase output current Iu to the motor M. An output terminal 102v outputs a V-phase output voltage Vv and a V-phase output current Iv to the motor M.

An output terminal 102w outputs a W-phase output voltage Vw and a W-phase output current Iw to the motor M.

Figure 2:
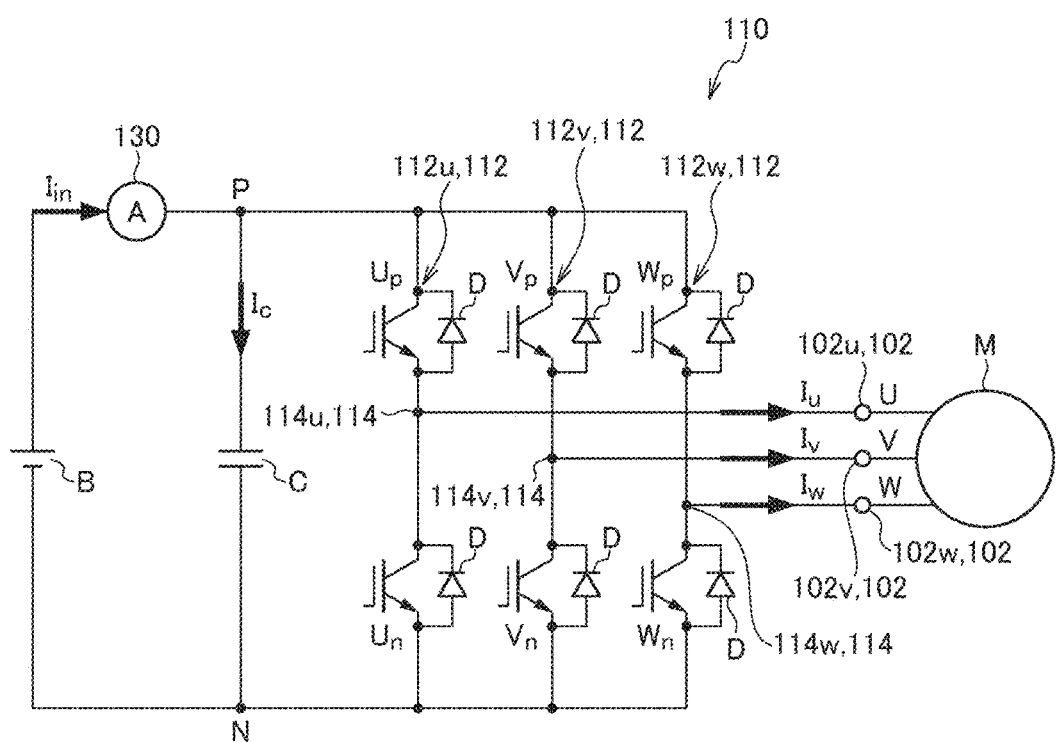
FIG. 2 is a circuit diagram illustrating an inverter circuit according to an example embodiment of the present disclosure.

Next, the inverter circuit 110 will be described with reference to FIG. 2. FIG. 2 is a circuit diagram illustrating the inverter circuit 110. As illustrated in FIG. 2, the inverter circuit 110 applies a drive voltage to the windings of the plurality of phases.

The inverter circuit 110 includes a first power supply terminal P, a second power supply terminal N, a capacitor C, and three series bodies 112.

A first voltage V1 is applied to the first power supply terminal P. The first power supply terminal P is connected to a DC voltage source B.

A second voltage V2 is applied to the second power supply terminal N. The second power supply terminal N is connected to the DC voltage source B. The second voltage V2 is lower than the first voltage V1.

The capacitor C is connected between the first power supply terminal P and the second power supply terminal N.

The three serial bodies 112 include a series body 112u, a series body 112v, and a series body 112w. The three series bodies 112 are connected in parallel to each other. One end of each of the three series bodies 112 is connected to the first power supply terminal P. The other end of each of the three series bodies 112 is connected to the second power supply terminal N.

In each of the three series bodies 112, two semiconductor switching elements are connected in series. The semiconductor switching element is, for example, an insulated gate bipolar transistor (IGBT). Note that the semiconductor switching element may be another transistor such as a field effect transistor. A rectifier element D is connected in parallel to each of these semiconductor switching elements with the first power supply terminal P side (the upper side in the drawing) as a cathode and the second power supply terminal N side (the lower side in the drawing) as an anode. In a case where a field effect transistor is used as the semiconductor switching element, a parasitic diode may be used as the rectifier element.

Each of the three series bodies 112 includes a first semiconductor switching element and a second semiconductor switching element. Specifically, the series body 112u includes a first semiconductor switching element Up and a second semiconductor switching element Un. The series body 112v includes a first semiconductor switching element Vp and a second semiconductor switching element Vn. The series body 112w includes a first semiconductor switching element Wp and a second semiconductor switching element Wn.

The first semiconductor switching element Up, the first semiconductor switching element Vp, and the first semiconductor switching element Wp are connected to the first power supply terminal P. In other words, the first semiconductor switching element Up, the first semiconductor switching element Vp, and the first semiconductor switching element Wp are semiconductor switching elements on a high voltage side.

The second semiconductor switching element Un, the second semiconductor switching element Vn, and the second semiconductor switching element Wn are connected to the second power supply terminal N. In other words, the second semiconductor switching element Un, the second semiconductor switching element Vn, and the second semiconductor switching element Wn are semiconductor switching elements on a low voltage side.

The first semiconductor switching element and the second semiconductor switching element are connected at a connection point 114. Specifically, the first semiconductor switching element Up and the second semiconductor switching element Un are connected at a connection point 114u. The first semiconductor switching element Vp and the second semiconductor switching element Vn are connected at a connection point 114v. The first semiconductor switching element Wp and the second semiconductor switching element Wn are connected at a connection point 114w.

The connection point 114 in each of the three series bodies 112 is connected to the three output terminals 102. Specifically, the connection point 114u of the series body 112u is connected to the output terminal 102u. The connection point 114v in the series body 112v is connected to the output terminal 102v. The connection point 114w in the series body 112w is connected to the output terminal 102w.

A PWM signal is input to the first semiconductor switching element Up, the first semiconductor switching element Vp, and the first semiconductor switching element Wp. The PWM signal is output from the controller 120. Hereinafter, in the present specification, the PWM signal input to the first semiconductor switching element Up may be referred to as an "UpPWM signal". The PWM signal input to the first semiconductor switching element Vp may be referred to as a "VpPWM signal". The PWM signal input to the first semiconductor switching element Wp may be referred to as a "WpPWM signal". The first semiconductor switching element Up, the first semiconductor switching element Vp, and the first semiconductor switching element Wp are switched on and off at a frequency higher than the frequency of an AC output. For example, the first semiconductor switching element Up, the first semiconductor switching element Vp, and the first semiconductor switching element Wp are turned on in a case where the UpPWM signal, the VpPWM signal, and the WpPWM signal are at a HIGH level, respectively. On the other hand, the first semiconductor switching element Up, the first semiconductor switching element Vp, and the first semiconductor switching element Wp are turned off in a case where the UpPWM signal, the VpPWM signal, and the WpPWM signal are at a LOW level, respectively.

A PWM signal is input to the second semiconductor switching element Un, the second semiconductor switching element Vn, and the second semiconductor switching element Wn. The PWM signal is output from the controller 120. Hereinafter, in the present specification, the PWM signal input to the second semiconductor switching element Un may be referred to as an "UnPWM signal". In addition, the PWM signal input to the second semiconductor switching element Vn may be referred to as a "VnPWM signal". The PWM signal input to the second semiconductor switching element Wn may be referred to as a "WnPWM signal". The second semiconductor switching element Un, the second semiconductor switching element Vn, and the second semiconductor switching element Wn are switched on and off at a frequency higher than the frequency of an AC output. For example, the second semiconductor switching element Un, the second semiconductor switching element Vn, and the second semiconductor switching element Wn are turned on in a case where the UnPWM signal, the VnPWM signal, and the WnPWM signal are at a HIGH level, respectively. On the other hand, the second semiconductor switching element Un, the second semiconductor switching element Vn, and the second semiconductor switching element Wn are turned off in a case where the UnPWM signal, the VnPWM signal, and the WnPWM signal are at a LOW level, respectively.

Figure 3:
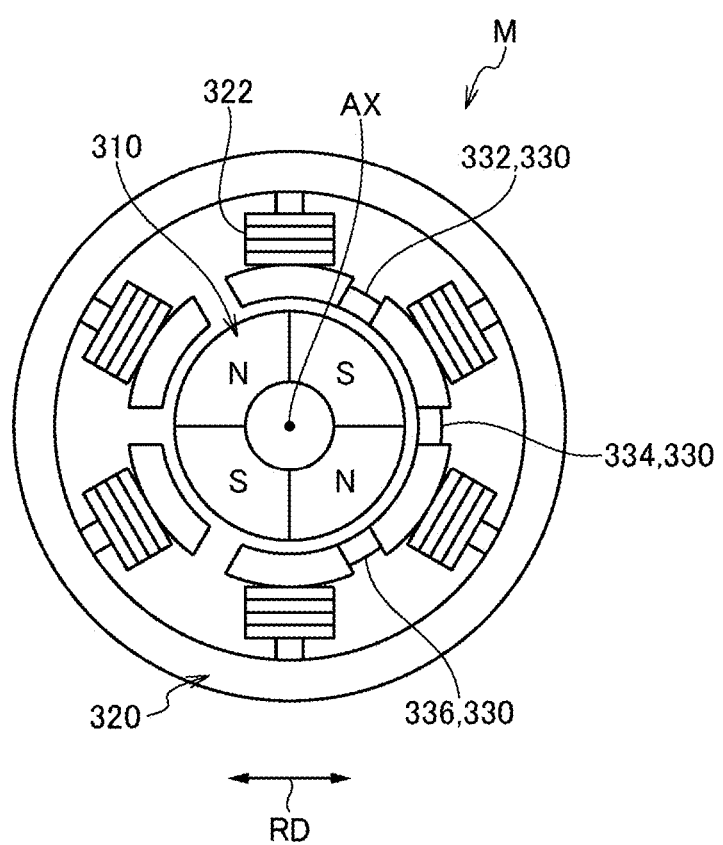
FIG. 3 is a schematic diagram illustrating a motor according to an example embodiment of the present disclosure.

Next, the motor M will be described with reference to FIG. 3. FIG. 3 is a schematic diagram illustrating the motor M. As illustrated in FIG. 3, the motor M includes a rotor 310, a stator 320, and three Hall sensors 330.

The rotor 310 is arranged about a central axis AX extending in a horizontal direction. That is, as an example, the motor M is an inner rotor type motor. The rotor 310 rotates about the central axis AX. The rotor 310 is arranged on the inner side of the stator 320 in a radial direction RD. The rotor 310 is rotatable with respect to the stator 320.

The stator 320 is arranged about the central axis AX extending in the horizontal direction. The stator 320 faces the rotor 310 in the radial direction RD. The stator 320 has windings 322 of a plurality of phases. In the present example embodiment, the stator 320 has three-phase windings 322.

The three Hall sensors 330 include a Hall sensor 332, a Hall sensor 334, and a Hall sensor 336. The Hall sensor 332 is a U-phase Hall sensor. The Hall sensor 334 is a V-phase Hall sensor. The Hall sensor 336 is a W-phase Hall sensor. The Hall sensor 330 is, for example, a magnetic sensor. The Hall sensor 330 is spaced from the rotor 310 and detects the magnetic pole of the rotor 310. The Hall sensor 330 is arranged in the vicinity of the rotor 310. In the present example embodiment, the Hall sensor 330 is arranged on the stator 320. The Hall sensor 330 outputs a detection result (for example, a change in magnetic pole) to the controller 120.

As illustrated in FIG. 1, the controller 120 is a hardware circuit including a processor such as a central processing unit (CPU), an application specific integrated circuit (ASIC), and the like. Then, the processor of the controller 120 executes the motor control software stored in a storage device. The controller 120 includes a rotational speed calculator 121 and an energization controller 122.

The controller 120 controls the inverter circuit 110. Specifically, the controller 120 controls the inverter circuit 110 by generating a PWM signal and outputting the PWM signal. More specifically, the controller 120 generates a PWM signal to be input to each of the three series bodies 112.

The rotational speed calculator 121 calculates the rotational speed of the rotor 310 on the basis of the change in the magnetic pole detected by the Hall sensor 330. In addition, the rotational speed calculator 121 calculates the rotational speed of the rotor 310 with respect to the stator 320 on the basis of the rotational position of the rotor 310.

The energization controller 122 controls an energization timing for each of the windings 322 of the plurality of phases on the basis of the rotational speed and the Hall sensor setting position. The Hall sensor setting position indicates the setting position of the Hall sensor 330 on the motor control software with respect to the winding 322 of each phase.

Figure 4:
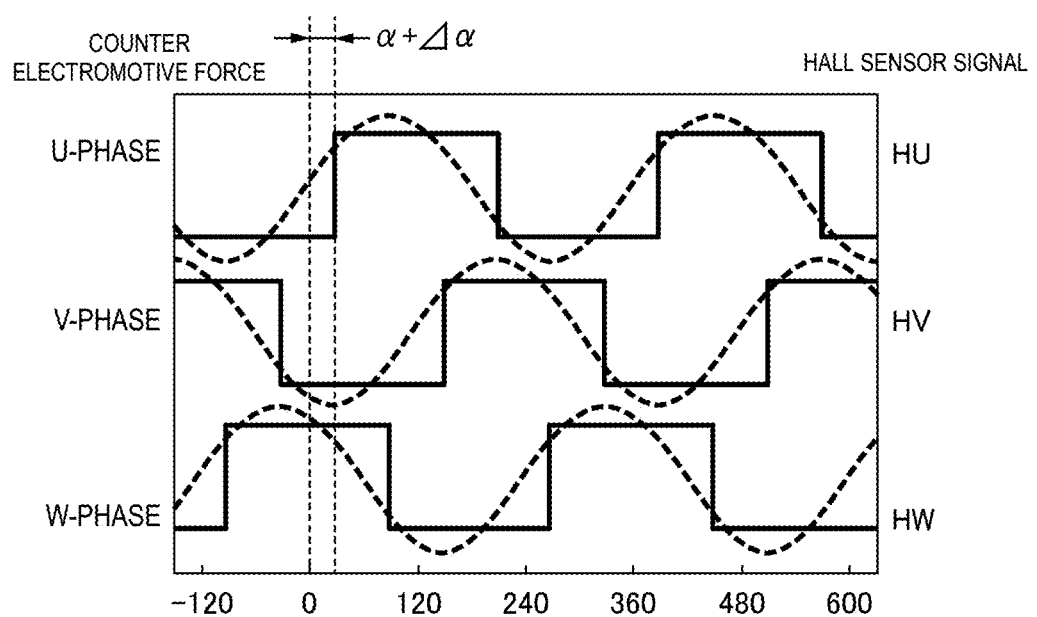
FIG. 4 is a diagram illustrating a counter electromotive force and a Hall sensor signal according to an example embodiment of the present disclosure.

Incidentally, in general, when the motor M is manufactured, an attachment error (positional deviation) occurs between the design position of the Hall sensor 330 with respect to the winding 322 of each phase and the actual position of the Hall sensor 330 with respect to the winding 322 of each phase. The positional deviation will be described with reference to FIG. 4. FIG. 4 is a diagram illustrating a counter electromotive force and a Hall sensor signal. In FIG. 4, the energization controller 122 controls the energization timing for each of the windings 322 of the plurality of phases on the basis of the position of the Hall sensor 330 on the motor control software with respect to the winding 322 of each phase.

As illustrated in FIG. 4, the waveform of the counter electromotive force has a sinusoidal wave shape. The position of the winding 322 of the stator 320 corresponds to the waveform of the counter electromotive force. The Hall sensor signal has a rectangular wave shape.

a is a value determined by a positional relationship between the position of the winding 322 of the stator 320 and the Hall sensor 330. A deviation $+\Delta\alpha$ occurs in the Hall sensor signal due to an attachment error between the winding 322 of the stator 320 and the Hall sensor 330.

The controller 120 further includes a forward rotation information acquisition unit 123, a reverse rotation information acquisition unit 124, and a determination unit 125.

The forward rotation information acquisition unit 123 acquires forward rotation information. The forward rotation information indicates a change in the value of the current Iin flowing through the inverter circuit 110 at the time of the rotor 310 rotating in a forward direction CW when the Hall sensor setting position is changed. The forward direction CW is, for example, clockwise. Specifically, the forward rotation information acquisition unit 123 creates the forward rotation information when the rotor 310 rotates at a predetermined speed for a predetermined period in the forward direction CW. The predetermined speed may be, for example, a rotational speed at which the motor M is used after shipment, or may be a maximum rotational speed of the motor M. The predetermined period is, for example, an arbitrary period determined by the user, and is a period in which the rotational speed of the motor M is stabilized.

Specifically, assuming that the Hall sensor setting position is a first Hall sensor setting position, the forward rotation information acquisition unit 123 acquires the value of the current Iin flowing through the inverter circuit 110 when the energization timing for each of the windings 322 of the plurality of phases is controlled. The first hall sensor setting position indicates, for example, the design position (for example, θ degrees) of the hall sensor 330 with respect to the winding 322 of each phase.

Next, assuming that the Hall sensor setting position is a second Hall sensor setting position, the forward rotation information acquisition unit 123 acquires the value of the current Iin flowing through the inverter circuit 110 when the energization timing for each of the windings 322 of the plurality of phases is controlled. The second hall sensor setting position indicates a position (for example, θ+0.1 degrees) obtained by adding a predetermined amount (for example, 0.1 degrees) to the first hall sensor setting position. The predetermined amount is arbitrarily determined by the user, for example.

Next, assuming that the Hall sensor setting position is a third Hall sensor setting position, the forward rotation information acquisition unit 123 acquires the value of the current Iin flowing through the inverter circuit 110 when the energization timing for each of the windings 322 of the plurality of phases is controlled. The third hall sensor setting position indicates a position (for example, θ−0.1 degrees) obtained by adding a predetermined amount (for example, −0.1 degrees) to the first hall sensor setting position.

Similarly, for example, assuming that the Hall sensor setting position is a fourth Hall sensor setting position, a fifth Hall sensor setting position, a sixth Hall sensor setting position, a seventh Hall sensor setting position, an eighth Hall sensor setting position, or a ninth Hall sensor setting position, the forward rotation information acquisition unit 123 acquires the value of the current Iin flowing through the inverter circuit 110. The fourth hall sensor setting position indicates a position (for example, θ+0.2 degrees) obtained by adding a predetermined amount (for example, 0.2 degrees) to the first hall sensor setting position. The fifth hall sensor setting position indicates a position (for example, θ−0.2 degrees) obtained by adding a predetermined amount (for example, −0.2 degrees) to the first hall sensor setting position. The sixth hall sensor setting position indicates a position (for example, θ+0.3 degrees) obtained by adding a predetermined amount (for example, 0.3 degrees) to the first hall sensor setting position. The seventh hall sensor setting position indicates a position (for example, θ−0.3 degrees) obtained by adding a predetermined amount (for example, −0.3 degrees) to the first hall sensor setting position. The eighth hall sensor setting position indicates a position (for example, θ+0.4 degrees) obtained by adding a predetermined amount (for example, 0.4 degrees) to the first hall sensor setting position. The ninth hall sensor setting position indicates a position (for example, θ−0.4 degrees) obtained by adding a predetermined amount (for example, −0.4 degrees) to the first hall sensor setting position. Note that the value of the current Iin may be an average value during a predetermined period or an intermediate value during the predetermined period.

The reverse rotation information acquisition unit 124 acquires reverse rotation information. The reverse rotation information indicates a change in the value of the current Iin flowing through the inverter circuit 110 at the time of the rotor 310 rotating in a reverse direction CCW when the Hall sensor setting position is changed. The reverse direction CCW is, for example, counterclockwise. Specifically, the reverse rotation information acquisition unit 124 creates the reverse rotation information when the rotor 310 rotates at a predetermined speed for a predetermined period in the reverse direction CCW.

Specifically, assuming that the Hall sensor setting position is the first Hall sensor setting position, the reverse rotation information acquisition unit 124 acquires the value of the current Iin flowing through the inverter circuit 110 when the energization timing for each of the windings 322 of the plurality of phases is controlled.

Next, assuming that the Hall sensor setting position is the second Hall sensor setting position, the reverse rotation information acquisition unit 124 acquires the value of the current Iin flowing through the inverter circuit 110 when the energization timing for each of the windings 322 of the plurality of phases is controlled.

Next, assuming that the Hall sensor setting position is the third Hall sensor setting position, the reverse rotation information acquisition unit 124 acquires the value of the current Iin flowing through the inverter circuit 110 when the energization timing for each of the windings 322 of the plurality of phases is controlled.

Similarly, assuming that the Hall sensor setting position is the fourth Hall sensor setting position, the fifth Hall sensor setting position, the sixth Hall sensor setting position, the seventh Hall sensor setting position, the eighth Hall sensor setting position, and the ninth Hall sensor setting position, the reverse rotation information acquisition unit 124 acquires the value of the current Iin flowing through the inverter circuit 110. Note that the value of the current Iin may be an average value during a predetermined period or an intermediate value during the predetermined period.

The determination unit 125 determines the Hall sensor adjustment position on the basis of the forward rotation information and the reverse rotation information. The Hall sensor adjustment position indicates a position obtained by adding a correction amount to the Hall sensor setting position. As a result, the determination unit 125 determines the correction amount by using both the forward rotation information and the reverse rotation information as compared with the case of using either the forward rotation information or the reverse rotation information. Therefore, the motor M can be adjusted with high accuracy. Note that the determination unit 125 may calculate the Hall sensor adjustment position or may calculate the correction amount.

Specifically, the determination unit 125 determines the Hall sensor setting position with a smallest difference value among the plurality of Hall sensor setting positions as the Hall sensor adjustment position. The difference value indicates the absolute value of a difference between the value of the current Iin when the rotor 310 rotates in the forward direction CW and the value of the current Iin when the rotor 310 rotates in the reverse direction CCW, at the same Hall sensor setting position. Therefore, the adjustment position of the Hall sensor can be easily determined without complicated calculation.

For example, assuming that the Hall sensor setting position is the first Hall sensor setting position, the determination unit 125 calculates the absolute value of the difference between the value of the current Iin when the rotor 310 rotates in the forward direction CW and the value of the current Iin when the rotor 310 rotates in the reverse direction CCW. In addition, assuming that the Hall sensor setting position is the second Hall sensor setting position, the determination unit 125 calculates the absolute value of the difference between the value of the current Iin when the rotor 310 rotates in the forward direction CW and the value of the current Iin when the rotor 310 rotates in the reverse direction CCW. As described above, the determination unit 125 calculates the absolute value of the difference between the value of the current Iin when the rotor 310 rotates in the forward direction CW and the value of the current Iin when the rotor 310 rotates in the reverse direction CCW.

Figure 5:
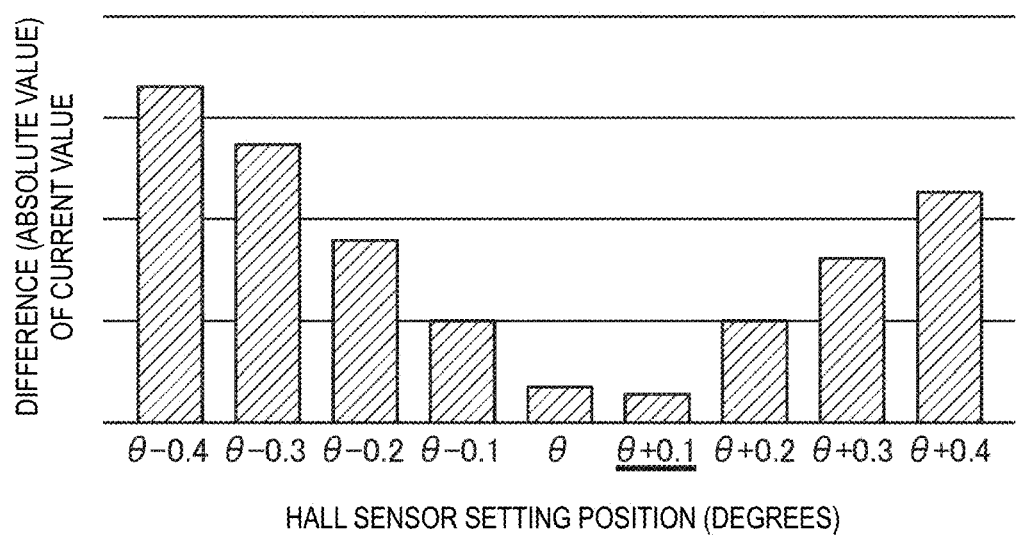
FIG. 5 is a diagram illustrating an absolute value of a difference of current values with respect to a Hall sensor setting position according to an example embodiment of the present disclosure.

Next, a determination method for determining the Hall sensor adjustment position will be described with reference to FIG. 5. FIG. 5 is a diagram illustrating the absolute value of a difference of current values with respect to the Hall sensor setting position. In FIG. 5, a horizontal axis represents the Hall sensor setting position. A vertical axis represents the absolute value of the difference between the value of the current Iin when the motor M rotates in the forward direction CW and the value of the current Iin when the motor M rotates in the reverse direction CCW.

As illustrated in FIG. 5, when a Hall sensor installation position is at the electrical angle θ+0.1 degrees, the absolute value of the difference between the current values is minimum. The determination unit 125 sets a position (electrical angle θ+0.1 degrees) at which the absolute value of the difference between the current values is minimum as the Hall sensor adjustment position. Therefore, the adjustment position of the Hall sensor can be easily determined without complicated calculation.

Figure 6:
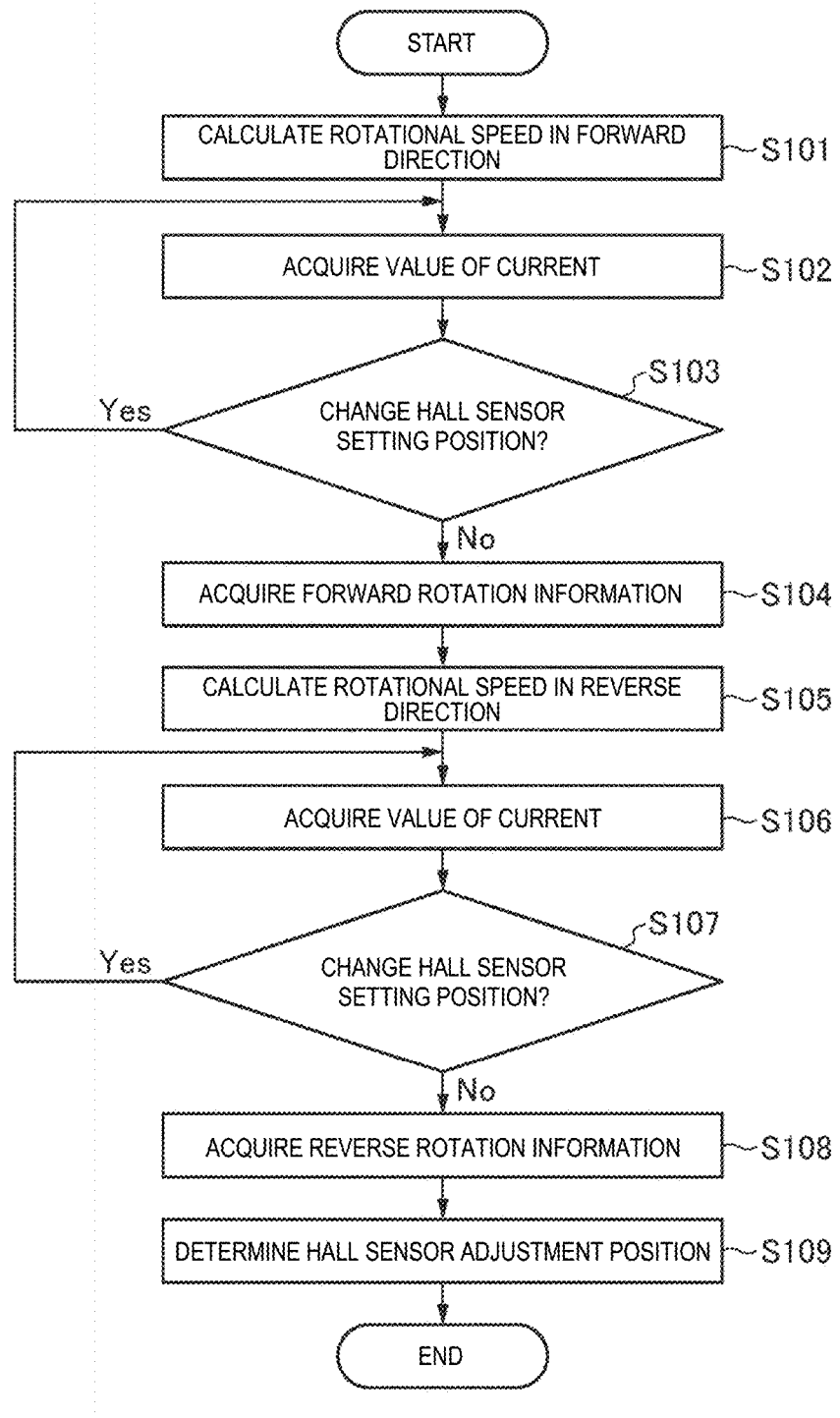
FIG. 6 is a flowchart illustrating a motor adjustment method according to the first example embodiment.

Next, a motor adjustment method according to the example embodiment of the present disclosure will be described with reference to FIG. 6. FIG. 6 is a flowchart illustrating the motor adjustment method according to the example embodiment of the present disclosure. Motor adjustment is performed by executing the processing of steps S101 to S109.

Step S101: The energization controller 122 causes the rotor 310 to rotate in the forward direction CW, and the rotational speed calculator 121 calculates the rotational speed of the rotor 310 on the basis of the change in the magnetic pole detected by the Hall sensor 330. The processing proceeds to step S102.

Step S102: The forward rotation information acquisition unit 123 acquires the value of the current Iin from the current detector 130. The processing proceeds to step S103.

Step S103: The forward rotation information acquisition unit 123 determines whether or not to change the Hall sensor setting position. When the forward rotation information acquisition unit 123 determines to change the Hall sensor setting position (Yes in step S103), the processing returns to step S102. On the other hand, when the forward rotation information acquisition unit 123 determines not to change the Hall sensor setting position (No in step S103), the processing proceeds to step S104.

Step S104: The forward rotation information acquisition unit 123 creates the forward rotation information. The processing proceeds to step S105. Note that step S104 is an example of the "forward rotation information acquisition process".

Step S105: The energization controller 122 causes the rotor 310 to rotate in the reverse direction CCW, and the rotational speed calculator 121 calculates the rotational speed of the rotor 310 on the basis of the change in the magnetic pole detected by the Hall sensor 330. The processing proceeds to step S106.

Step S106: The reverse rotation information acquisition unit 124 acquires the value of the current Iin from the current detector 130. The processing proceeds to step S107.

Step S107: The reverse rotation information acquisition unit 124 determines whether or not to change the Hall sensor setting position. When the reverse rotation information acquisition unit 124 determines to change the Hall sensor setting position (Yes in step S107), the processing returns to step S106. On the other hand, when the reverse rotation information acquisition unit 124 determines not to change the Hall sensor setting position (No in step S107), the processing proceeds to step S108.

Step S108: The reverse rotation information acquisition unit 124 creates the reverse rotation information. The processing proceeds to step S109. Note that step S108 is an example of the "reverse rotation information acquisition process".

Step S109: The determination unit 125 determines the Hall sensor adjustment position on the basis of the forward rotation information and the reverse rotation information. The processing ends. Note that step S109 is an example of the "determination process".

As described above with reference to FIG. 6, the motor adjustment method includes the forward rotation information acquisition process, the reverse rotation information acquisition process, and the determination process. Therefore, the motor M can be adjusted with high accuracy.

Figure 7:
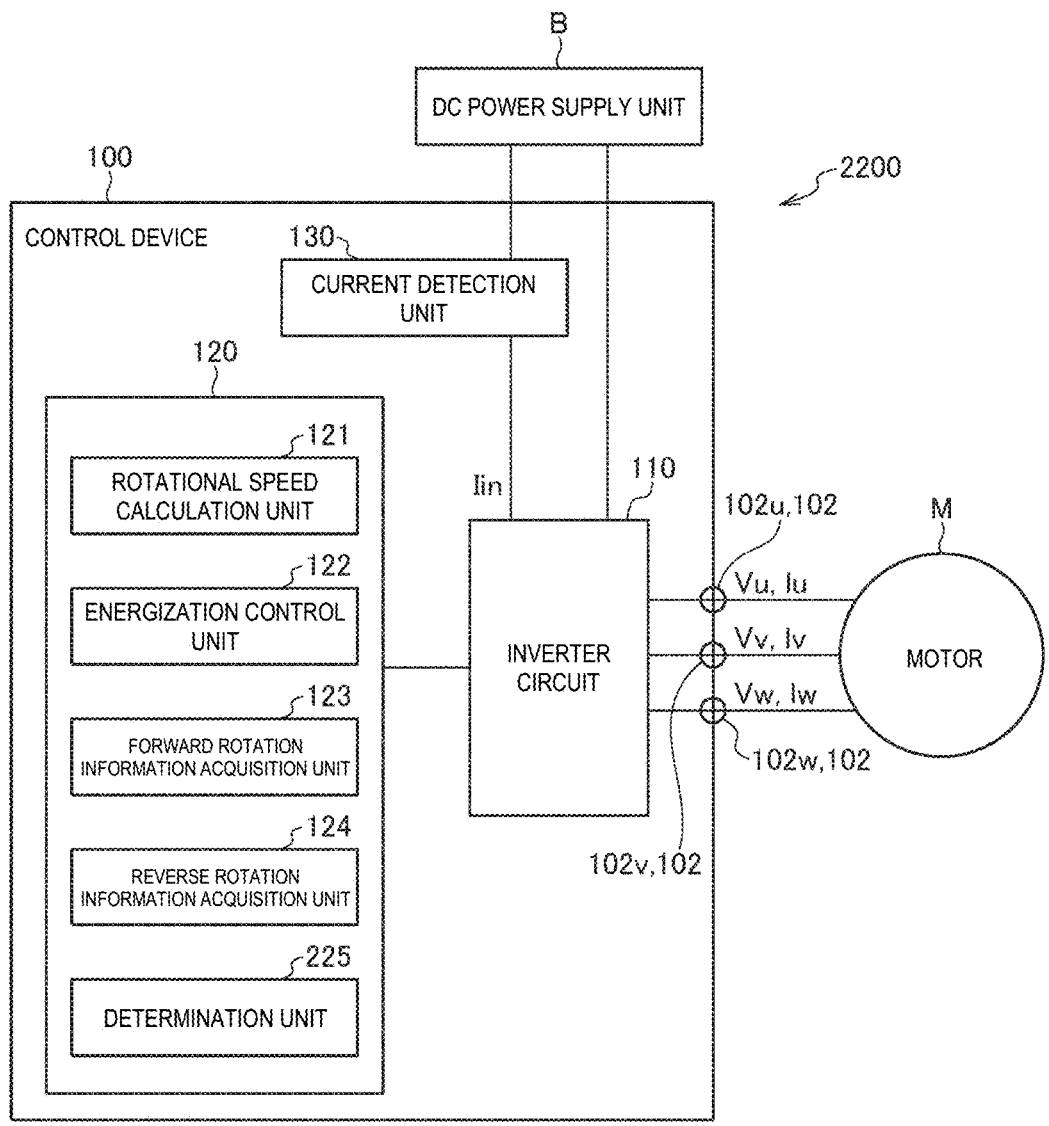
FIG. 7 is a block diagram of a controller according to a second example embodiment of the present disclosure.

An adjustment system 2200 according to a second example embodiment of the present disclosure will be described with reference to FIG. 7. FIG. 7 is a block diagram of the adjustment system 2200 according to the second example embodiment of the present disclosure. The second example embodiment is different from the first example embodiment in the method of determining the Hall sensor adjustment position. Hereinafter, differences from the first example embodiment will be mainly described.

The forward rotation information acquisition unit 123 acquires forward rotation information. The forward rotation information indicates a change in the value of the current Iin flowing through the inverter circuit 110 at the time of the rotor 310 rotating in the forward direction CW when the Hall sensor setting position is scanned. For example, the forward rotation information acquisition unit 123 performs polynomial approximation on the values of the plurality of currents Iin to create forward rotation information. The forward rotation information is based on a forward rotation relational expression indicating a relationship between the value of the current Iin and the Hall sensor setting position.

The reverse rotation information acquisition unit 124 acquires reverse rotation information. The reverse rotation information indicates a change in the value of the current Iin flowing through the inverter circuit 110 at the time of the rotor 310 rotating in the reverse CCW when the Hall sensor setting position is scanned. The reverse rotation information acquisition unit 124 performs polynomial approximation on the values of the plurality of currents Iin to create reverse rotation information. The reverse rotation information is based on a reverse rotation relational expression indicating a relationship between the current value and the Hall sensor setting position.

The determination unit 225 determines the Hall sensor setting position corresponding to the intersection of the forward rotation relational expression and the reverse rotation relational expression as the Hall sensor adjustment position. Therefore, the Hall sensor adjustment position can be determined with high accuracy.

Figure 8:
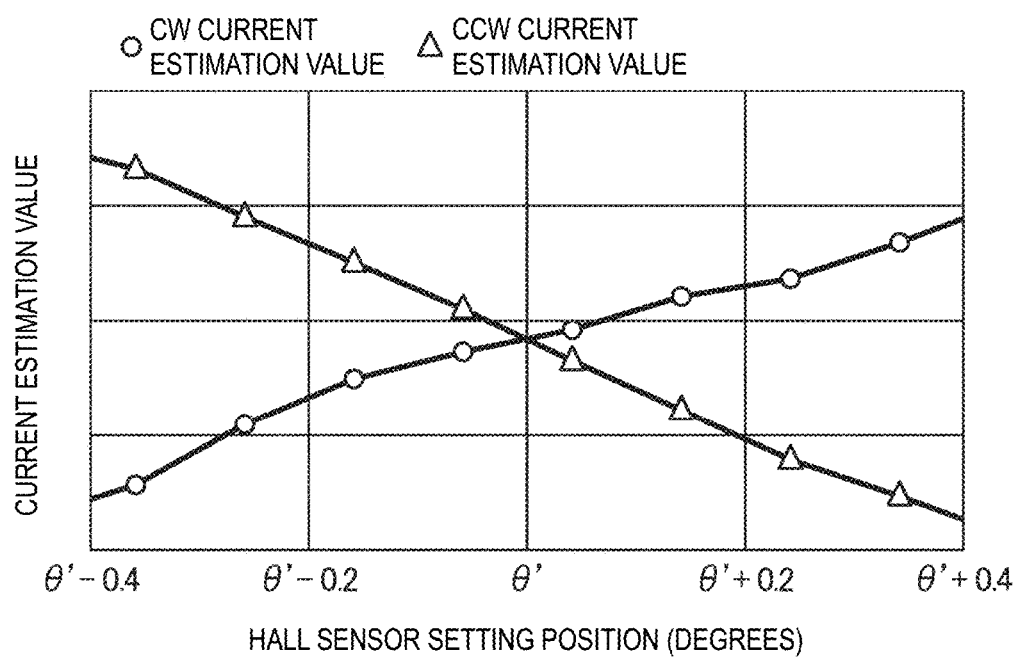
FIG. 8 is a diagram illustrating the current value with respect to the Hall sensor setting position.

Next, the determination method for determining the Hall sensor adjustment position will be described with reference to FIG. 8. FIG. 8 is a diagram illustrating the current value with respect to the Hall sensor setting position. In FIG. 8, a horizontal axis represents the Hall sensor setting position. A vertical axis represents the value of the current Iin. A round mark indicates the value of the current Iin when the motor M rotates in the forward direction CW. A triangular mark indicates the value of the current Iin when the motor M rotates in the reverse direction CCW.

As illustrated in FIG. 8, when the Hall sensor installation position is at an electrical angle θ' degrees, the forward rotation relational expression and the reverse rotation relational expression intersect each other. The determination unit 225 sets, as the Hall sensor adjustment position, a position (electrical angle θ' degrees) at which the forward rotation relational expression and the reverse rotation relational expression intersect each other. Therefore, the Hall sensor adjustment position can be determined with high accuracy.

Figure 9:
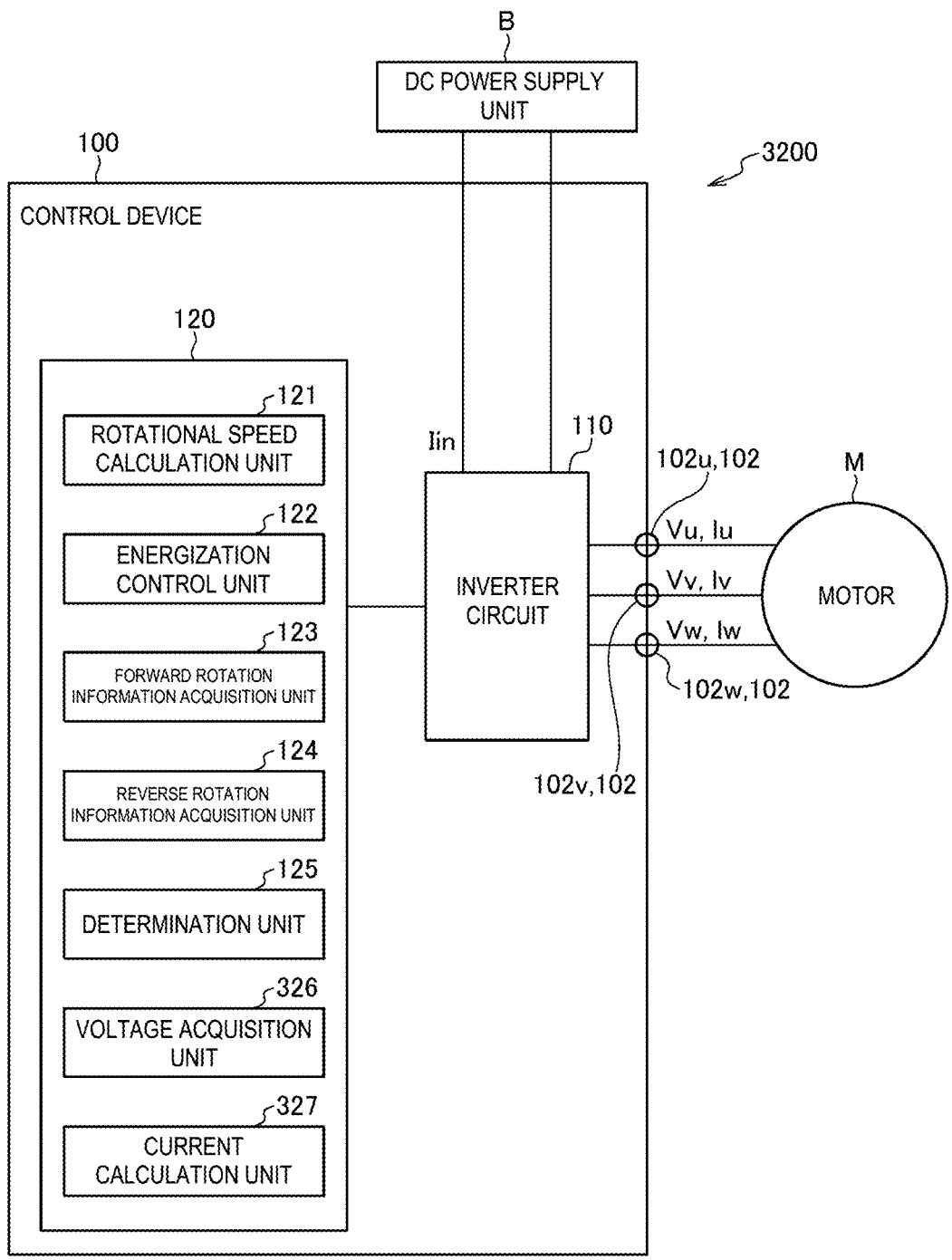
FIG. 9 is a block diagram of a controller according to a third example embodiment of the present disclosure.

An adjustment system 3200 according to a third example embodiment of the present disclosure will be described. FIG. 9 is a block diagram of the adjustment system 3200 according to the third example embodiment of the present disclosure. The third example embodiment is different from the first example embodiment in that the controller 100 does not include the current detector 130. Hereinafter, differences from the first example embodiment will be mainly described.

As illustrated in FIG. 9, the controller 120 includes a voltage acquisition unit 326 and a current calculator 327.

The voltage acquisition unit 326 acquires values Vs and Vc of the voltages applied to the inverter circuit 110. For example, the voltage acquisition unit 326 acquires the values Vs and Vc of the voltages determined by the user.

The current calculator 327 calculates the estimation values of currents Is and Ic flowing through the motor M on the basis of the voltage values Vs and Vc and a rotational speed co, and calculates the estimation value of the current Iin flowing through the inverter circuit 110 on the basis of Expression (1) from the estimation values of the currents Is and Ic flowing through the motor M and the voltage Vin applied to the inverter circuit 110. As a result, it is not necessary to provide the current detector 130, and it is possible to suppress an increase in size of the circuit.

[Math. 1]

$$I_{in} = \frac{V_s I_s + V_c I_c}{V_{in}} \quad (1)$$

Here, for example, the current calculator 327 calculates the estimation values Is and Ic of the current flowing through the motor M on the basis of Expression (2).

[Math. 2]

$$\begin{bmatrix} V_s \\ V_c \end{bmatrix} = R\begin{bmatrix} I_s \\ I_c \end{bmatrix} + \omega\begin{bmatrix} 0 & L_c \\ -L_s & 0 \end{bmatrix}\begin{bmatrix} I_s \\ I_c \end{bmatrix} + \begin{bmatrix} L_s & 0 \\ 0 & L_c \end{bmatrix}\frac{d}{dt}\begin{bmatrix} I_s \\ I_c \end{bmatrix} + K_e\omega\begin{bmatrix} 1 \\ 0 \end{bmatrix} \quad (2)$$

Note that Vs and Vc are motor voltages, Is and Ic are motor currents, Vin is a power supply voltage, Iin is a power supply current, R is a winding resistance, Ls and Lc are winding inductances, ω is a rotational speed, and Ke is an induced voltage constant.

The forward rotation information acquisition unit 123 acquires forward rotation information. The forward rotation information indicates a change in the estimation value Iin of the current flowing through the inverter circuit 110 at the time of the rotor 310 rotating in the forward direction CW when the Hall sensor setting position is changed. Specifically, the forward rotation information acquisition unit 123 creates the forward rotation information when the rotor 310 rotates at a predetermined speed for a predetermined period in the forward direction CW.

Specifically, assuming that the Hall sensor setting position is the first Hall sensor setting position, the forward rotation information acquisition unit 123 calculates the estimation value Iin of the current flowing through the inverter circuit 110 when the energization timing for each of the windings 322 of the plurality of phases is controlled. Next, assuming that the Hall sensor setting position is the second Hall sensor setting position, the forward rotation information acquisition unit 123 calculates the estimation value Iin of the current flowing through the inverter circuit 110 when the energization timing for each of the windings 322 of the plurality of phases is controlled.

Next, assuming that the Hall sensor setting position is the third Hall sensor setting position, the forward rotation information acquisition unit 123 calculates the estimation value Iin of the current flowing through the inverter circuit 110 when the energization timing for each of the windings 322 of the plurality of phases is controlled. Note that the value of the estimation value Iin of the current may be an average value during a predetermined period or an intermediate value during the predetermined period.

The reverse rotation information acquisition unit 124 acquires reverse rotation information. The reverse rotation information indicates a change in the estimation value Iin of the current flowing through the inverter circuit 110 at the time of the rotor 310 rotating in the reverse CCW when the Hall sensor setting position is scanned. Specifically, the reverse rotation information acquisition unit 124 creates the reverse rotation information when the rotor 310 rotates at a predetermined speed for a predetermined period in the reverse direction CCW.

Specifically, assuming that the Hall sensor setting position is the first Hall sensor setting position, the reverse rotation information acquisition unit 124 calculates the estimation value Iin of the current flowing through the inverter circuit 110 when the energization timing for each of the windings 322 of the plurality of phases is controlled. Next, assuming that the Hall sensor setting position is the second Hall sensor setting position, the reverse rotation information acquisition unit 124 calculates the estimation value Iin of the current flowing through the inverter circuit 110 when the energization timing for each of the windings 322 of the plurality of phases is controlled.

Next, assuming that the Hall sensor setting position is the third Hall sensor setting position, the reverse rotation information acquisition unit 124 calculates the estimation value Iin of the current flowing through the inverter circuit 110 when the energization timing for each of the windings 322 of the plurality of phases is controlled. Note that the value of the estimation value Iin of the current may be an average value during a predetermined period or an intermediate value during the predetermined period.

Figure 10:
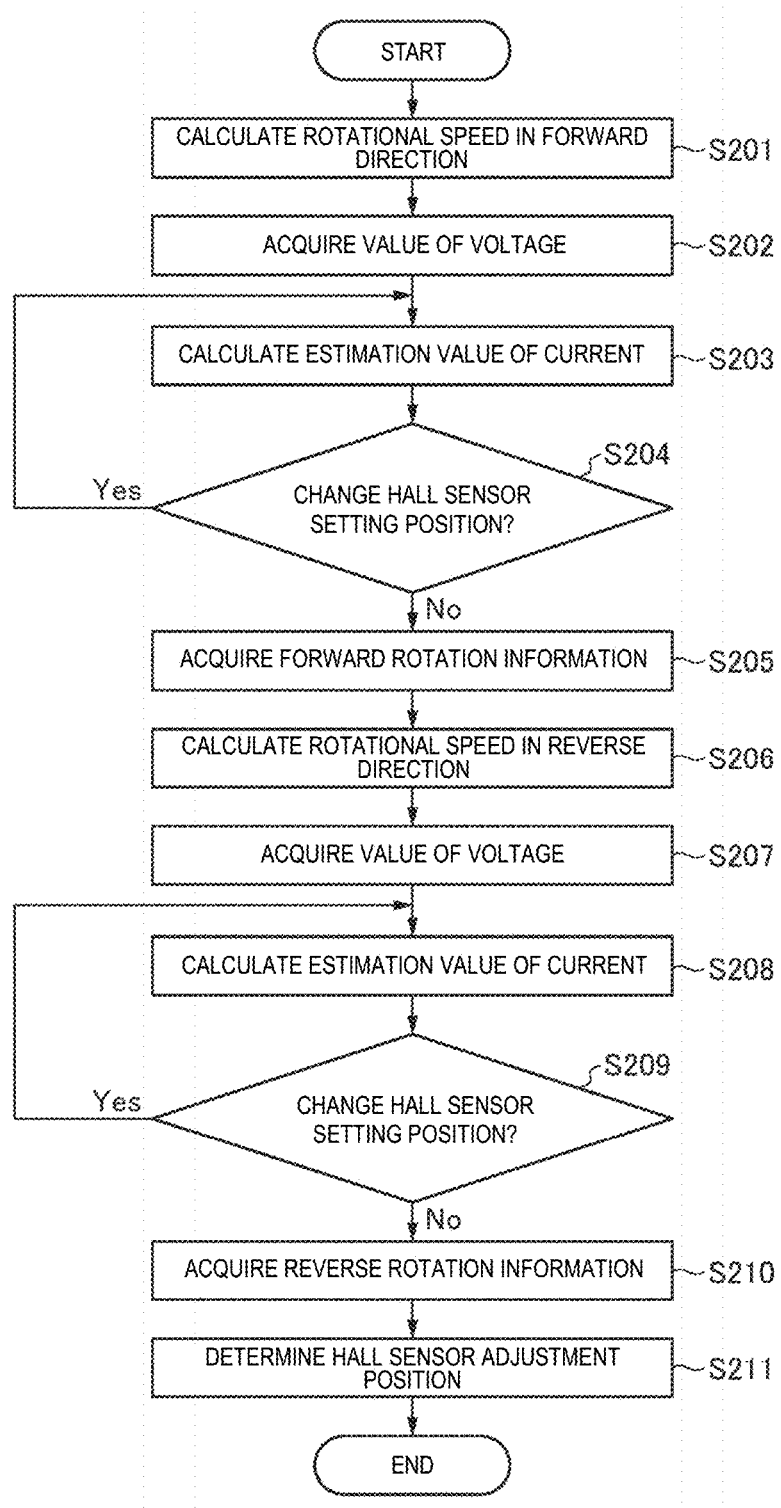
FIG. 10 is a flowchart illustrating a motor adjustment method according to the third example embodiment.

Next, a motor adjustment method according to the third example embodiment will be described with reference to FIG. 10. FIG. 10 is a flowchart illustrating the motor adjustment method according to the third example embodiment. Motor adjustment is performed by executing the processing of steps S201 to S211.

Step S201: The energization controller 122 causes the rotor 310 to rotate in the forward direction CW, and the rotational speed calculator 121 calculates the rotational speed of the rotor 310 on the basis of the change in the magnetic pole detected by the Hall sensor 330. The processing proceeds to step S202. Note that step S201 is an example of the "rotational speed calculation process".

Step S202: The voltage acquisition unit 326 acquires the values Vs and Vc of the voltages applied to the inverter circuit 110. The processing proceeds to step S203. Note that step S202 is an example of the "voltage acquisition process".

Step S203: The current calculator 327 calculates the estimation values of the currents Is and Ic flowing to the motor M on the basis of the voltage values Vs and Vc and the rotational speed ω, and calculates the estimation value Iin of the current flowing to the inverter circuit 110 on the basis of the estimation values of the currents Is and Ic flowing to the motor M and the voltage Vin applied to the inverter circuit 110. The processing proceeds to step S204. Note that step S203 is an example of the "current calculation process".

Step S204: The forward rotation information acquisition unit 123 determines whether or not to change the Hall sensor setting position. When the forward rotation information acquisition unit 123 determines to change the Hall sensor setting position (Yes in step S204), the processing returns to step S203. On the other hand, when the forward rotation information acquisition unit 123 determines not to change the Hall sensor setting position (No in step S204), the processing proceeds to step S205.

Step S205: The forward rotation information acquisition unit 123 acquires the forward rotation information. The processing proceeds to step S206. Note that step S205 is an example of the "forward rotation information acquisition process".

Step S206: The energization controller 122 causes the rotor 310 to rotate in the reverse direction CCW, and the rotational speed calculator 121 calculates the rotational speed of the rotor 310 on the basis of the change in the magnetic pole detected by the Hall sensor 330. The processing proceeds to step S207.

Step S207: The voltage acquisition unit 326 acquires the values Vs and Vc of the voltages applied to the inverter circuit 110. The processing proceeds to step S208. Note that step S208 is an example of the "voltage acquisition process".

Step S208: The current calculator 327 calculates the estimation values of the currents Is and Ic flowing to the motor M on the basis of the voltage values Vs and Vc and the rotational speed co, and calculates the estimation value Iin of the current flowing to the inverter circuit 110 on the basis of the estimation values of the currents Is and Ic flowing to the motor M and the voltage Vin applied to the inverter circuit 110. The processing proceeds to step S209. Note that step S208 is an example of the "current calculation process".

Step S209: The forward rotation information acquisition unit 123 determines whether or not to change the Hall sensor setting position. When the forward rotation information acquisition unit 123 determines to change the Hall sensor setting position (Yes in step S209), the processing returns to step S208. On the other hand, when the forward rotation information acquisition unit 123 determines not to change the Hall sensor setting position (No in step S209), the processing proceeds to step S210.

Step S210: The reverse rotation information acquisition unit 124 acquires the reverse rotation information. The processing proceeds to step S211. Note that step S210 is an example of the "reverse rotation information acquisition process".

Step S211: The determination unit 125 determines the Hall sensor adjustment position on the basis of the forward rotation information and the reverse rotation information. The processing ends. Note that step S211 is an example of the "determination process".

The example embodiments of the present disclosure have been described above with reference to the drawings (FIGS. 1 to 10). It should be noted that the present disclosure is not limited to the above-described example embodiments and is implementable in various forms within a range not departing from the scope of the present disclosure. For easy understanding, the drawings schematically illustrate each component as the subject, and the thickness, length, number, and the like of each illustrated constituent element are different from actual ones for convenience of drawing. Additionally, the material, shape, dimension, and the like of each component illustrated in the above-described example embodiments are mere examples and are not particularly limited, and various modifications can be made without substantially departing from the effects of the present disclosure.

As described with reference to FIGS. 1 to 10, in the first to third example embodiments, the motor M is connected to the controller 100 before shipment. However, the present disclosure is not limited thereto. The motor M and the controller 100 may be integrated. Then, the controller 100 may adjust the Hall sensor setting position at a predetermined timing. As a result, the Hall sensor setting position can be adjusted at the time of aging deterioration or impact detection. Therefore, the motor M can always be used in an efficient state.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor adjustment method for adjusting a motor driven by a controller, wherein
the motor includes:
   a stator that includes windings of a plurality of phases;
   a rotor that is rotatable with respect to the stator; and
   a Hall sensor that is spaced from the rotor to detect a magnetic pole of the rotor; and
the controller includes:
   a driver to apply a drive voltage to the windings of the plurality of phases;
   a rotational speed calculator to calculate a rotational speed of the rotor on a basis of a change in a magnetic pole detected by the Hall sensor; and
   an energization controller to control an energization timing for each of the windings of the plurality of phases on a basis of the rotational speed and a Hall sensor setting position;
the motor adjustment method comprises:
acquiring forward rotation information indicating a change in a value of a current flowing through the driver at a time of the rotor rotating in a forward direction when the Hall sensor setting position is changed;
acquiring reverse rotation information indicating a change in a value of a current flowing through the driver at a time of the rotor rotating in a reverse direction when the Hall sensor setting position is changed; and
determining a Hall sensor adjustment position on a basis of the forward rotation information and the reverse rotation information; wherein
the Hall sensor adjustment position indicates a position obtained by adding a correction amount to the Hall sensor setting position.

2. The motor adjustment method according to claim 1, wherein
in the determining, the Hall sensor setting position with a smallest difference value among a plurality of the Hall sensor setting positions is determined as the Hall sensor adjustment position; and
the difference value indicates an absolute value of a difference between a value of the current when the rotor rotates in the forward direction and a value of the current when the rotor rotates in the reverse direction, at a same Hall sensor setting position.

3. The motor adjustment method according to claim 1, wherein
in the acquiring of the forward rotation information, the forward rotation information is acquired by scanning the Hall sensor setting position;
in the acquiring of the reverse rotation information, the reverse rotation information is acquired by scanning the Hall sensor setting position;
the forward rotation information is based on a forward rotation relational expression indicating a relationship between the value of the current and the Hall sensor setting position;
the reverse rotation information is based on a reverse rotation relational expression indicating a relationship between the value of the current and the Hall sensor setting position; and
in the determining, the Hall sensor setting position corresponding to an intersection of the forward rotation relational expression and the reverse rotation relational expression is determined as the Hall sensor adjustment position.

4. The motor adjustment method according to claim 1, further comprising:
- calculating a rotational speed of the rotor on a basis of a change in a magnetic pole of the rotor detected by the Hall sensor;
- acquiring a value of a voltage applied to the driver; and
- calculating the value of the current flowing through the driver on a basis of the value of the voltage and the rotational speed.

5. The motor adjustment method according to claim 1, wherein the controller further includes a current detector to detect the value of the current flowing through the driver.

* * * * *